United States Patent
Zeng et al.

(10) Patent No.: US 11,871,346 B2
(45) Date of Patent: Jan. 9, 2024

(54) WAKE UP SIGNAL FOR CELLULAR COMMUNICATION IN UNLICENSED SPECTRUM

(71) Applicant: Apple Inc., Cupertino, CA (US)

(72) Inventors: Wei Zeng, San Diego, CA (US); Dawei Zhang, Saratoga, CA (US); Haitong Sun, Irvine, CA (US); Wei Zhang, Santa Clara, CA (US); Tianyan Pu, Cupertino, CA (US); Yuchul Kim, Santa Clara, CA (US); Yuqin Chen, Shenzhen (CN); Farouk Belghoul, Campbell, CA (US); Haijing Hu, Beijing (CN); Fangli Xu, Beijing (CN); Sami M. Almalfouh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 851 days.

(21) Appl. No.: 16/480,784

(22) PCT Filed: Aug. 10, 2018

(86) PCT No.: PCT/CN2018/099958
§ 371 (c)(1),
(2) Date: Jul. 25, 2019

(87) PCT Pub. No.: WO2020/029249
PCT Pub. Date: Feb. 13, 2020

(65) Prior Publication Data
US 2021/0352582 A1 Nov. 11, 2021

(51) Int. Cl.
*H04W 52/02* (2009.01)
*H04W 72/0446* (2023.01)
(Continued)

(52) U.S. Cl.
CPC .... *H04W 52/0229* (2013.01); *H04W 72/0446* (2013.01); *H04W 74/006* (2013.01); *H04W 74/0816* (2013.01)

(58) Field of Classification Search
None
See application file for complete search history.

(56) References Cited

U.S. PATENT DOCUMENTS

| | | | |
|---|---|---|---|
| 8,761,307 B1 | 6/2014 | Ionescu | |
| 2007/0265002 A1* | 11/2007 | Machida | H04W 72/02 455/435.1 |

(Continued)

FOREIGN PATENT DOCUMENTS

| | | |
|---|---|---|
| CN | 104796971 | 7/2015 |
| CN | 106465411 A | 2/2017 |

(Continued)

OTHER PUBLICATIONS

G. Keiser, Optical Fiber Communications, 378 (McGraw-Hill, Inc. 2nd ed. 1991).*

(Continued)

*Primary Examiner* — Gregory B Sefcheck
*Assistant Examiner* — Joshua Smith
(74) *Attorney, Agent, or Firm* — Kowert, Hood, Munyon, Rankin & Goetzel, P.C.

(57) ABSTRACT

This disclosure relates to using a wake up signal in conjunction with cellular communication in unlicensed spectrum. A cellular base station may provide a wake up signal on an unlicensed frequency channel after successful completion of a listen-before-talk procedure. The wake up signal may include a preamble configured for coherent detection, and information indicating channel occupancy time for a cellular communication by the cellular base station and a cell identifier for the cellular base station. A wireless device (Continued)

may monitor the unlicensed frequency channel for a wake up signal, and may determine whether to monitor the unlicensed frequency channel for control channel signaling based on whether a wake up signal is received, and potentially also based on the contents of the wake up signal if a wake up signal is received.

20 Claims, 8 Drawing Sheets

(51) Int. Cl.
*H04W 74/08* (2009.01)
*H04W 74/00* (2009.01)

(56) References Cited

U.S. PATENT DOCUMENTS

| | | | |
|---|---|---|---|
| 2008/0242298 A1 | 10/2008 | Nylander et al. | |
| 2010/0254293 A1* | 10/2010 | Son | H04W 76/28 370/311 |
| 2011/0046698 A1* | 2/2011 | Kivi | H04W 76/19 607/60 |
| 2014/0111313 A1* | 4/2014 | Wild | H04W 48/20 340/10.42 |
| 2015/0023315 A1* | 1/2015 | Yerramalli | H04W 74/002 370/330 |
| 2015/0189574 A1* | 7/2015 | Ng | H04W 24/08 370/252 |
| 2015/0289208 A1* | 10/2015 | Liu | H04L 5/0098 370/252 |
| 2016/0057731 A1* | 2/2016 | Damnjanovic | H04W 72/23 455/458 |
| 2016/0226637 A1* | 8/2016 | Nory | H04L 5/0053 |
| 2017/0142721 A1 | 5/2017 | Azizi | |
| 2017/0332327 A1 | 11/2017 | Fang | |

FOREIGN PATENT DOCUMENTS

| | | |
|---|---|---|
| CN | 106576325 | 4/2017 |
| CN | 106664673 | 5/2017 |
| CN | 108029144 A | 5/2018 |
| KR | 1020160031543 A | 3/2016 |
| KR | 1020170071505 A | 6/2017 |
| WO | WO 2015/199932 A1 | 12/2015 |
| WO | WO 2016/064486 A1 | 4/2016 |

OTHER PUBLICATIONS

Random House Webster's College Dictionary, 1465 (2nd Random House ed. 1999).*
Notice of Preliminary Rejection, with English Translation, dated Feb. 27, 2020, from Korean Patent Application No. 10-2019-7023231, 17 pgs.
ZTE; "Considerations on DL reference signals and channels design for NR-U", 3GPP TSG RAN WG1 Meeting #93 R1-1806460; Busan, Korea. May 25, 2018. 7 Pages.
Extended European Search Report for Patent Application No. EP 18903048, dated Sep. 11, 2020, 7 pages.
First Examination Report for Application No. IN 201917031233, dated Jan. 29, 2021, 6 pages.
Office Action for CN Patent Application for Invention No. 201880011056.3; dated Jul. 5, 2023.
Huawei et al. "On wake-up signal for eFeMTC", 3GPP TSG RAN WG1 Meeting #92 R1-1801430, Feb. 26, 2018.
Ericsson "Wake-up signal for MTC",3GPP TSG-RAN WG1 Meeting #93 R1-1805851, May 20, 2018.
Office Action for Chinese Application for Invention No. 201880011056.3; dated Jan. 28, 2023.

* cited by examiner

… (1)

WAKE UP SIGNAL FOR CELLULAR COMMUNICATION IN UNLICENSED SPECTRUM

FIELD

The present application relates to wireless communications, and more particularly to systems, apparatuses, and methods for providing a wake up signal for cellular communication in unlicensed spectrum.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements for wireless communications while allowing the UE device to maintain good transmit and receive abilities for improved communications. Accordingly, improvements in the field are desired.

SUMMARY

Embodiments are presented herein of apparatuses, systems, and methods for using a wake up signal in conjunction with cellular communication in unlicensed spectrum.

According to the techniques described herein, the wake up signal may include a preamble that facilitates coherent detection by interested wireless devices, as well as information regarding a cellular communication including the wake up signal, such as a total channel occupancy time of the cellular communication, and a cell identifier associated with the cellular communication. A cellular base station may provide such a wake up signal on an unlicensed frequency channel after successfully completing a listen-before-talk procedure and leading up to the next available slot or mini-slot boundary according to a synchronization scheme used by the cellular base station.

The wake up signal may be detected by other wireless devices monitoring the unlicensed frequency channel, such as wireless devices served by the cellular base station, other cellular base stations, and wireless devices served by those other cellular base stations, among various possibilities. Those devices may be able to determine, e.g., based on the information included with the wake up signal, whether the cellular communication being performed by the cellular base station may be intended for them. A wireless device may thus correspondingly determine to monitor the unlicensed frequency channel (e.g., for control channel signaling) during the indicated channel occupancy time if the cellular communication being performed by the cellular base station may be intended for it, or may determine to not monitor the unlicensed frequency channel (e.g., in which case it may be able to sleep) during the indicated channel occupancy time if the cellular communication being performed by the cellular base station is not intended for it.

Such techniques may thus reduce the power consumption burden on wireless devices performing cellular communication in unlicensed spectrum, e.g., by allowing them to avoid performing blind control channel decoding during certain periods of time when they are able to determine that no control signaling will be provided to them. Additionally, such techniques may improve coexistence on unlicensed spectrum, e.g., since coherent wake up signal preamble decoding may allow for devices to more effectively determine when the medium is occupied and thus to avoid performing transmissions that might cause interference than by using energy detection alone, at least according to some embodiments.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
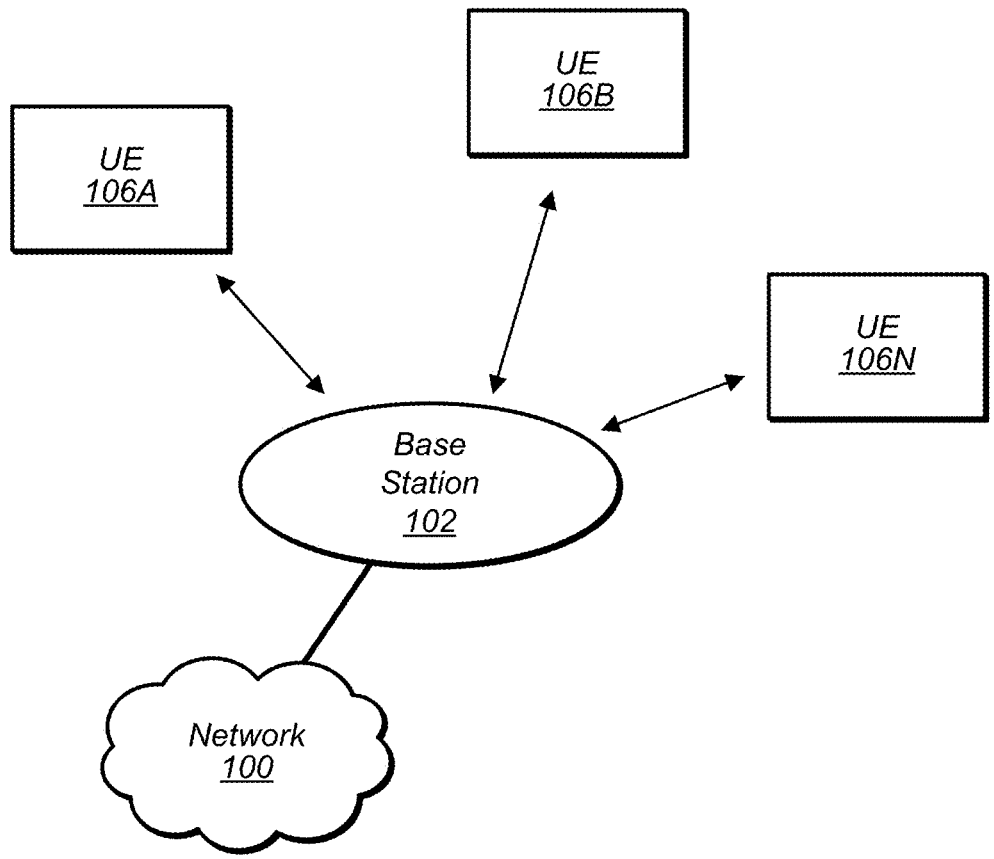
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
  UE: User Equipment
  RF: Radio Frequency
  BS: Base Station
  GSM: Global System for Mobile Communication
  UMTS: Universal Mobile Telecommunication System
  LTE: Long Term Evolution
  NR: New Radio
  TX: Transmission/Transmit
  RX: Reception/Receive
  RAT: Radio Access Technology
Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
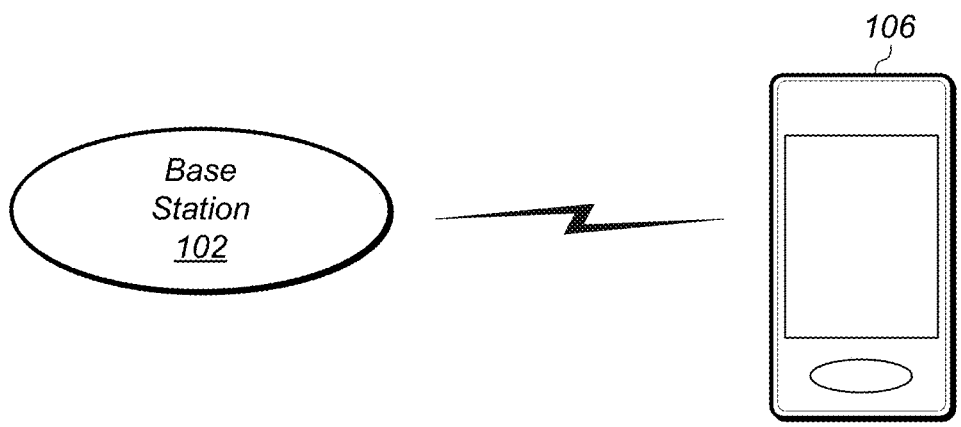
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to use a wake up signal in conjunction with cellular communication in unlicensed spectrum such as according to the various methods described herein. The UE 106 might also or alternatively be configured to communicate using WLAN, BLUETOOTH', one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH'. Other configurations are also possible.

Figure 3:
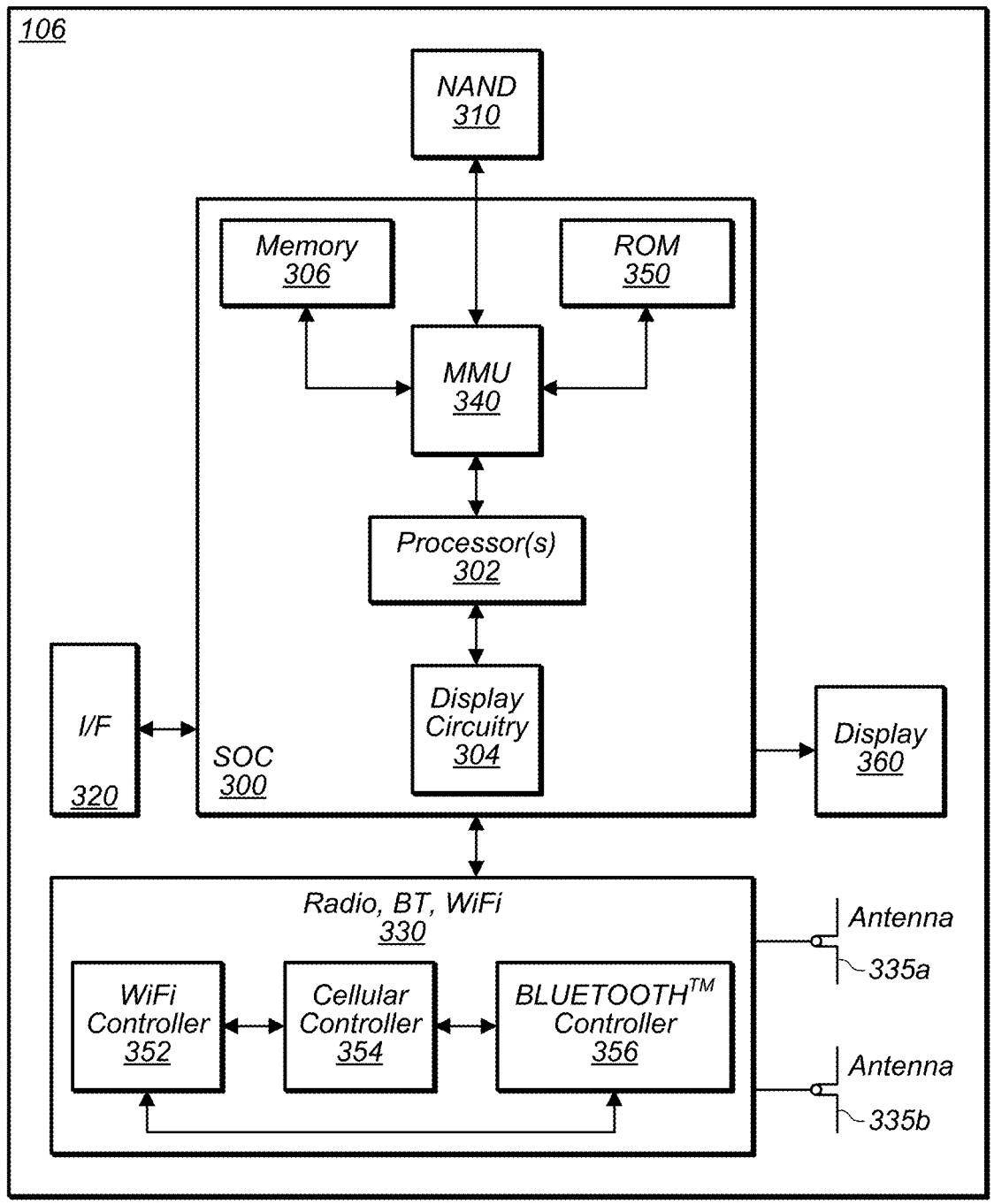
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH', Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to use a wake up signal in conjunction with cellular communication in unlicensed spectrum such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform beam failure recovery using a contention based random access procedure according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
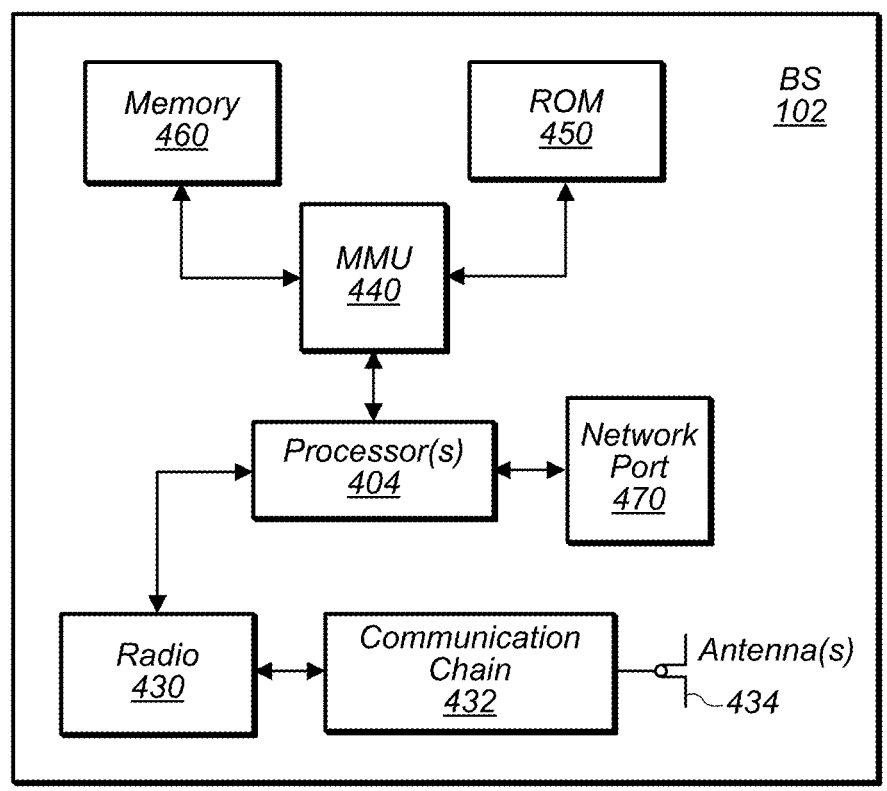
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for using a wake up signal in conjunction with cellular communication in unlicensed spectrum.

Figure 5:
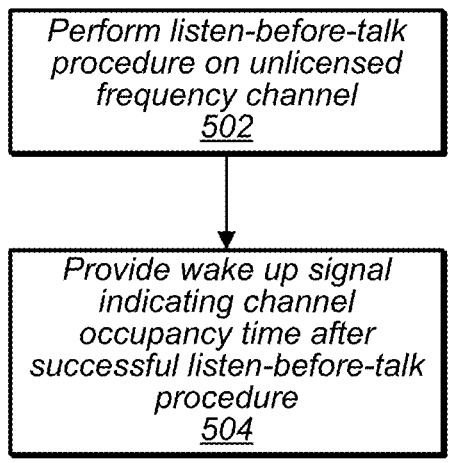
FIGS. 5-6 are communication flow diagrams illustrating aspects of exemplary possible methods for using wake up signals for cellular communication in unlicensed spectrum, according to some embodiments.
Figure 6:
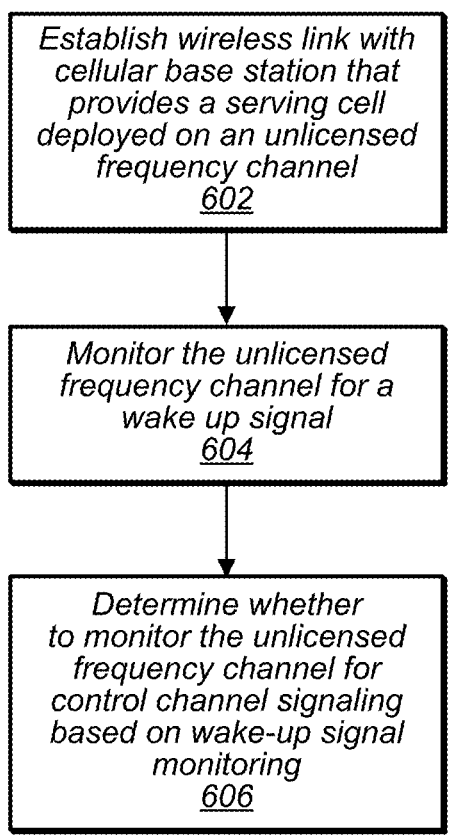

FIGS. 5-6—Wake Up Signal for Cellular Communication in Unlicensed Spectrum

As cellular communication technologies expand in use, new techniques are being developed to better serve cellular devices. Included among such possible techniques are techniques for performing cellular communication in unlicensed spectrum. For example, work on extensions of LTE (e.g., license assisted access (LAA)) and NR (e.g., NR unlicensed) is an active field in cellular communication technology development.

Since unlicensed spectrum may be shared among multiple networks and potentially among multiple wireless communication technologies, techniques that can help facilitate coexistence between such multiple parties may be particularly useful in such a context. For example, techniques that can help devices on an unlicensed frequency channel determine when the medium is in use may help reduce the power consumption and the amount of collisions/interference experienced by devices sharing the medium.

One such technique may include the use of a wake up signal in conjunction with cellular communication on unlicensed spectrum. FIGS. 5-6 illustrate aspects of such a technique. Aspects of the methods of FIGS. 5-6 may be implemented by a wireless device and a cellular base station, such as a UE 106 and a BS 102 illustrated in and described with respect to various of the Figures herein, or more generally in conjunction with any of the computer systems or devices shown in the above Figures, among other devices, as desired. Note that while at least some elements of the method of FIG. 5 are described in a manner relating to the use of communication techniques and/or features associated with LTE, LTE-A, NR, and/or 3GPP specification documents, such description is not intended to be limiting to the disclosure, and aspects of the methods of FIGS. 5-6 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, a cellular base station may perform a listen-before-talk (LBT) procedure on an unlicensed frequency channel. The cellular base station may perform the LBT procedure when the cellular base station would like to use the unlicensed frequency channel to perform a cellular communication, e.g., as a collision avoidance mechanism. The LBT procedure may include performing clear channel assessment to determine whether the unlicensed frequency channel is available for at least a configured minimum amount of time. Determining whether the unlicensed frequency channel is available may be based on performing energy detection to determine whether energy levels on the unlicensed frequency channel are above a configured threshold, as one possibility. Additionally or alternatively, determining whether the unlicensed frequency channel is available may be based on monitoring the unlicensed frequency channel for any preamble transmissions that the cellular base station or other devices are able to detect using coherent detection. The cellular base station may be configured to perform coherent detection of preambles transmitted by other devices according to the same wireless communication technology implemented by the cellular base station, and may possibly also be configured to perform coherent detection of preambles transmitted by other devices according to one or more other wireless communication technologies. For example, the cellular base station could be a NR gNB that is configured to detect NR wake up signals and that is also configured to detect Wi-Fi preambles. Other configurations are also possible.

The LBT procedure may further include, once the cellular base station has determined that the channel is available, initiating a random backoff counter. The random backoff counter may count down toward 0 while the channel remains available. If the channel becomes occupied before the random backoff counter is reduced to 0, the random backoff counter may be paused until the medium becomes available again (e.g., for at least a configured minimum amount of time in accordance with the clear channel assessment configuration of the cellular base station), at which time the countdown of the random backoff counter may be resumed. Once the random backoff counter reaches 0, the LBT procedure may be considered successful.

In 504, the cellular base station may provide a wake up signal after a successful listen-before-talk procedure. The wake up signal may include a preamble portion configured to facilitate coherent detection by other devices utilizing the unlicensed frequency channel, e.g., potentially including devices that are served by the cellular base station and devices that are not served by the cellular base station, such as other cellular base stations and devices served by those other cellular base stations. The wake up signal may also including information indicating a channel occupancy time for the cellular communication being performed by the cellular base station, e.g., including the wake up signal and any control and data communication following the wake up signal. Still further, the wake up signal may include information indicating a cell identifier for the cellular base station, e.g., to facilitate determination by devices monitoring the unlicensed frequency channel of whether the wake up signal is associated with their serving cell or another cell.

In some instances, the wake up signal may additionally include information indicating one or more wireless device group identifiers. Each such wireless device group identifier may indicate to wireless devices in a wireless device group associated with the wireless device group identifier that the cellular communication being performed by the cellular base station may involve wireless devices in the wireless device group.

Providing information regarding channel occupancy time, cell identifier, and possibly wireless device group identifier for a cellular communication may help wireless devices (e.g., potentially including wireless devices served by the cellular base station, other cellular base stations, and wireless devices served by other cellular base stations, among various possibilities) determine when to monitor the unlicensed frequency channel for control information, and/or when it is not necessary to monitor the unlicensed frequency channel for control information. For example, if a wake up signal indicates a cell identifier (and possibly a wireless device group identifier, e.g., if used by the cellular base station) that is associated with a wireless device, such information may indicate to the wireless device to monitor the unlicensed frequency channel for control channel signaling for the duration of the indicated channel occupancy time. If a wake up signal indicates a cell identifier (or possibly a wireless device group identifier, e.g., if used by the cellular base station) that is not associated with a wireless device, such information may indicate to the wireless device to not monitor the unlicensed frequency channel for control channel signaling or wake up signals for the duration of the indicated channel occupancy time.

Note that the cellular base station may also be able to make use of wake up signals, e.g., transmitted by other cellular base stations. For example, the cellular base station may detect a wake up signal provided by another cellular base station, e.g., during the LBT procedure or while otherwise monitoring the unlicensed frequency channel for wake up signals. The cellular base station may be able to determine the channel occupancy time indicated by the wake up signal provided by the other cellular base station, and may determine that the unlicensed frequency channel will be occupied for that duration. Based on such a determination, the cellular base station may pause the random backoff counter (e.g., if performing a LBT procedure) and may not perform clear channel assessment for duration of the indicated channel occupancy time. The cellular base station may resume performing clear channel assessment after the channel occupancy time of the unlicensed frequency channel by the other cellular base station is finished.

Note that in some instances, the wake up signal may be provided as a narrowband transmission, e.g., to reduce the power consumption required to monitor and detect wake up signals. The narrowband wake up signal transmissions may be repeated at multiple different frequency locations within the unlicensed frequency channel, according to some embodiments, e.g., to satisfy channel occupancy bandwidth requirements for the unlicensed frequency band in which the unlicensed frequency channel is located. Additionally or alternatively, such repetitions in frequency may provide potential for a receiving device to improve wake up signal detection performance by monitoring a wider bandwidth portion (e.g., potentially up to the entire bandwidth) of the unlicensed frequency channel, if desired, e.g., at the discretion of the receiving device. For example, other cellular base stations that deploy cells on the unlicensed frequency channel, which may prioritize effective wake up signal detection over reducing power consumption, might prefer to monitor the full unlicensed frequency channel and benefit from the multiple repetitions of the wake up signal in frequency, while battery-limited wireless devices monitoring the unlicensed frequency channel might prefer to monitor a narrower portion of the unlicensed frequency channel to benefit from the reduced power consumption required to do so.

As shown, the method of FIG. 6 may operate as follows.

In 602, a wireless device may establish a wireless link with a cellular base station. According to some embodiments, the wireless link may include a cellular link according to 5G NR. For example, the wireless device may establish a session with an AMF entity of the cellular network by way of a gNB that provides radio access to the cellular network. Note that the cellular network may also or alternatively operate according to another cellular communication technology (e.g., LTE, UMTS, CDMA2000, GSM, etc.), according to various embodiments.

Establishing the wireless link may include establishing a RRC connection with a serving cellular base station, at least according to some embodiments. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. The wireless device may also be capable of operating in a RRC idle or RRC inactive state while the wireless link is established, among various possibilities, e.g., at various times.

The cellular base station may provide a serving cell that is deployed on an unlicensed frequency channel to the wireless device. In 604, the wireless device may monitor the unlicensed frequency channel for a wake up signal during a wake up signal window. The wake up window for a given slot or mini-slot according to a synchronization scheme for the serving cell may occur immediately prior to the slot or mini-slot boundary, according to some embodiments. Other wake up window timing relative to slot/mini-slot boundaries is also possible.

In some instances, the wireless device may determine the length of the wake up signal window, possibly based on energy sensing that the wireless device also performs on the unlicensed frequency channel during an energy sensing window. In some embodiments, the wake up signal window associated with a given slot or mini-slot may have a base length and timing relative to the slot or mini-slot boundary for that slot or mini-slot. The energy sensing window may be the same as or may at least overlap with the base wake up signal window, according to some embodiments. If energy levels above a configured threshold are detected during the energy sensing window, this may be an indicator that the medium may be in use. Thus, if such elevated energy levels are detected but no wake up signal is detected, the wireless device may expand (e.g., select a longer length for) the wake up signal window, backward (e.g., using trace-back samples, if available) and/or forward in time, to increase the likelihood of detecting a wake up signal that might be transmitted by a cell that is operating asynchronously with the serving cell of the wireless device.

As previously noted, in some instances, the wake up signal may be provided using a narrower bandwidth than the full bandwidth of the unlicensed frequency channel, possibly with multiple repetitions of the narrowband signal at different locations within the unlicensed frequency channel.

In such a scenario, monitoring the unlicensed frequency channel for a wake up signal during the wake up signal window may be performed on a subset of the unlicensed frequency channel. Further, in some instances, the wireless device may be able to select which portion (e.g., including the width of the portion) of the unlicensed frequency channel to monitor when performing such wake up signal monitoring. Such selection may be performed by the wireless device based on any of a variety of possible considerations, potentially including cell signal strength, current estimated battery life of the wireless device, network configuration information, and/or any of various other possibilities.

If a wake up signal is detected, the wake up signal may indicate a channel occupancy time and a cell identifier. In some instances, the wake up signal may also indicate one or more wireless device group identifiers. Other information may also or alternatively be included with the wake up signal.

In 606, the wireless device may determine whether to monitor the unlicensed frequency channel for control channel signaling based at least in part on whether a wake up signal is detected. For example, as one possibility, the wireless device may determine to not monitor the unlicensed frequency channel for control channel signaling for a slot or mini-slot when a wake up signal is not detected during the wake up signal window associated with that slot or mini-slot.

If a wake up signal is detected, the wireless device may determine whether to monitor the unlicensed frequency channel for control channel signaling further based at least in part on the information indicated by the wake up signal. For example, the wireless device may determine to monitor the unlicensed frequency channel for control channel signaling for the slot or mini-slot associated with the wake up signal, and possibly for any other slots/mini-slots within the time duration of the indicated channel occupancy time, if the cell identifier indicated by the wake up signal is associated with the serving cell of the wireless device. If one or more wireless device group identifiers are indicated by the wake up signal, the wireless device may additionally require that the wireless device is associated with a wireless device group identifier indicated by the wake up signal to determine to monitor the unlicensed frequency channel for control channel signaling for the slot or mini-slot associated with the wake up signal and for any other slots/mini-slots within the time duration of the indicated channel occupancy time.

The wireless device may determine to not monitor the unlicensed frequency channel for control channel signaling for the slot or mini-slot associated with the wake up signal, and possibly for any other slots/mini-slots within the time duration of the indicated channel occupancy time, if the cell identifier indicated by the wake up signal is not associated with the serving cell of the wireless device. If one or more wireless device group identifiers are indicated by the wake up signal, the wireless device may also or alternatively determine to not monitor the unlicensed frequency channel for control channel signaling for the slot or mini-slot associated with the wake up signal, and possibly for any other slots/mini-slots within the time duration of the indicated channel occupancy time, if the wireless device is not associated with a wireless device group identifier indicated by the wake up signal.

Thus, using the methods of FIG. 5 and FIG. 6, cellular base stations and wireless devices sharing an unlicensed frequency channel may be able to improve coexistence with each other, e.g., by reducing the likelihood of collisions and interference, since coherent detection of wake up signal preambles may allow for more effective determination of when the medium is occupied and when the medium is available. Further, such techniques may enable a reduction in power consumption for such devices, e.g., by reducing the number of occasions on which a wireless device attempts blind decoding of a control channel, and instead operating in a lower power consumption (e.g., sleeping) mode or performing potentially lower energy cost wake up signal detection on those occasions when the wireless device is able to determine that it is not necessary to attempt blind decoding of the control channel.

FIGS. 7-13—Additional Information

FIGS. 7-13 and the following information are provided as being illustrative of further considerations and possible implementation details relating to the methods of FIGS. 5-6, and are not intended to be limiting to the disclosure as a whole. Numerous variations and alternatives to the details provided herein below are possible and should be considered within the scope of the disclosure.

LTE License Assisted Access (LAA) provides techniques for performing LTE cellular communication in unlicensed spectrum. According to such techniques, a eNB may perform a listen-before-talk (LBT) procedure to acquire channel access. This may include performing clear channel assessment (CCA) (e.g., including monitoring the channel to determine whether energy levels on the channel are above a certain threshold), and if the channel is available (e.g., has energy levels below a specified threshold for a certain amount of time), the eNB may start a random backoff procedure. The random backoff procedure may include starting a backoff counter having a randomly selected value between certain configured minimum and maximum values, and incrementing the counter down while the channel remains clear. If the channel becomes occupied before the backoff counter reaches 0, the eNB may perform clear channel assessment until the channel becomes available again, then may resume counting down the backoff counter until it reaches 0. At that point, the eNB may start transmitting (e.g., at the next available slot boundary, possibly with a reservation signal transmitted until the next available slot boundary).

A UE with such a LAA channel configured may monitor physical downlink control channel (PDCCH) resources (e.g., perform blind decoding) for control signaling at the beginning of each slot or mini-slot, e.g., according to the timing of the LAA cell to which it is attached. If the PDCCH contains any grants for the UE, the UE may perform uplink or downlink communication with the eNB, e.g., in accordance with the grant type(s) provided. If the UE receives an uplink grant and transmits on the physical uplink shared channel (PUSCH) over unlicensed spectrum, the UE may also perform a similar LBT procedure to ensure the medium is available before transmitting.

Figure 7:
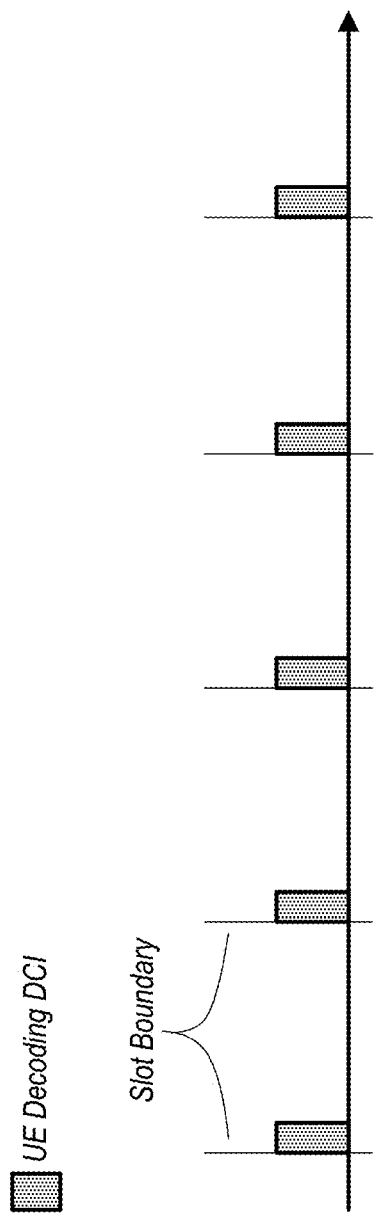
FIG. 7 illustrates an example cellular communication timeline showing slot boundaries, according to some embodiments.

FIG. 7 illustrates an example cellular communication timeline showing slot boundaries, such as might occur in a possible LTE LAA communication scenario, according to some embodiments. According to L LAA techniques, a UE may need to monitor the control channel at every slot, as shown. In NR unlicensed, this can be extended to every mini-slot, e.g., depending on network configuration. However, such blind decoding of the control channel represents a substantial source of power consumption by the UE, and it may be the case that in at least some instances (e.g., in a loaded network), the channel may not actually be available most of the time, such that the control decoding may result in effectively wasted power consumption.

For 5G NR deployments in unlicensed spectrum, such issues could be exacerbated by the potential for shorter intervals between slots, e.g., due to possible use of mini-slots and/or other techniques that can provide a flexible slot structure in 5G NR and potentially increase spectrum usage efficiency, such that the network could potentially configure a UE to monitor the control channel on an unlicensed frequency channel even more often. Currently, there are no techniques providing support for a UE to determine the channel occupancy time (CoT) by its own serving cell or other cells sharing the unlicensed frequency channel, or for an eNB/gNB to determine how long the CoT by another network may last.

Figure 8:
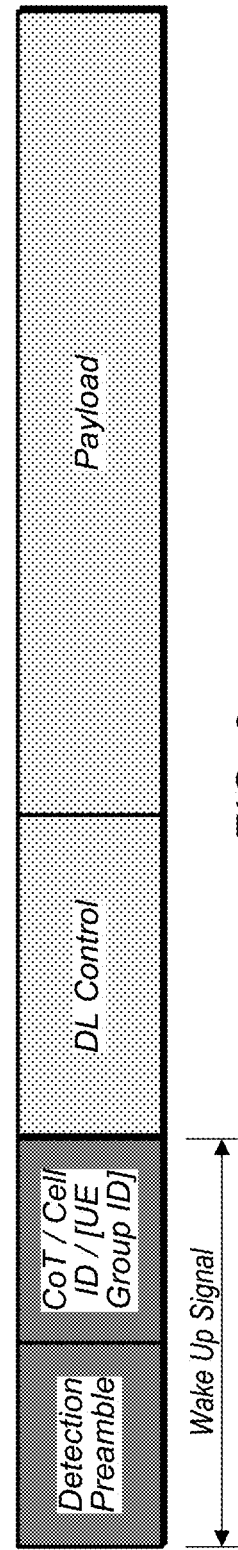
FIG. 8 illustrates an example logical representation of a possible cellular communication in unlicensed spectrum that uses a wake up signal, according to some embodiments.

Accordingly, it may be useful, at least according to some embodiments, for a cellular base station to provide a wake up signal in conjunction with cellular communications (e.g., including 5G NR communications, LTE communications, and/or other cellular communications) in unlicensed spectrum. FIG. 8 illustrates a example logical representation of a possible cellular communication in unlicensed spectrum that uses such a wake up signal, according to some embodiments. As shown, such a signal may include a detection preamble, which may be configured to be universally recognizable by devices performing NR communication in unlicensed spectrum ("NRU") (e.g., including by devices served by different networks), to allow for coherent detection of the wake up signal, according to some embodiments. It may also be possible to utilize an even more broadly recognizable preamble (e.g., potentially recognizable by devices configured to communicated according to LTE, Wi-Fi, and/or other wireless communication techniques configured for use in unlicensed spectrum), such as by re-using a Wi-Fi signature, if desired. The wake up signal may further include information indicating channel occupancy time (how long the channel will be occupied, e.g., including the wake up signal) and a cell ID of the cell occupying the channel. In some instances, it may also be possible to indicate a UE group ID in the wake up signal, e.g., indicating a group of UEs (e.g., that may represent a subset of UEs served by the cell) that should wake up for control monitoring during the indicated channel occupancy time.

Use of such a wake up signal may provide benefits both to other base stations (e.g., gNBs) that deploy cells on unlicensed spectrum as well as to UEs served by the base station providing the wake up signal and UEs served by other base stations that deploy cells on the same frequency channel, according to some embodiments. FIGS. 9-12 illustrate some of the potential benefits to such varied potential users of unlicensed spectrum.

Figure 9:
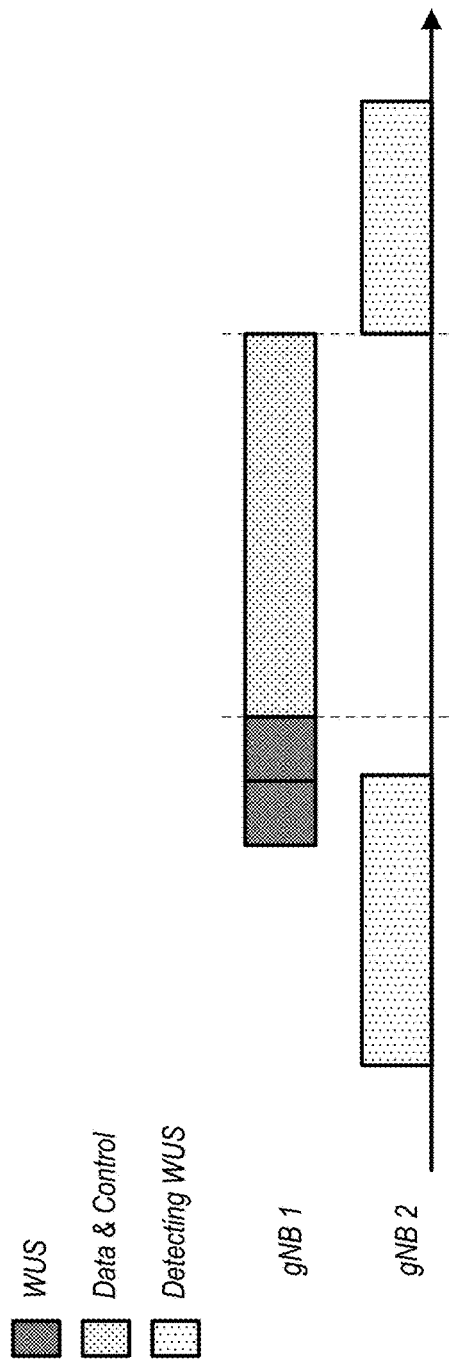
FIGS. 9-12 illustrate example cellular communication timelines showing various possible scenarios in which wake up signals are used for communication in unlicensed spectrum, according to some embodiments.

FIG. 9 illustrates a scenario in which multiple gNBs are operating on an unlicensed frequency channel. The gNBs may continuously monitor the medium for wake up signals (WUS) provided by other NRU gNBs, and may also perform energy detection, as part of CCA and LBT procedures. As shown, once a gNB (e.g., 'gNB 1' in FIG. 9) successfully completes a LBT procedure and grabs the channel, it may send out a wake up signal containing CoT and cell ID information. The wake up signal may be repeated by the gNB as a reservation signal, as needed, until the next scheduling position (slot boundary or mini-slot boundary). At the next available scheduling position, the gNB may send out downlink control information, which may be followed by data communication.

Since it may be possible to coherently detect the wake up signal, another gNB (e.g., 'gNB 2' in FIG. 9) monitoring the medium while gNB 1 is transmitting the wake up signal may have a higher likelihood of detecting that the medium is not available than by performing energy detection, which may lead to fewer collisions/less interference/better coexistence between NRU cells. Additionally, a gNB may be able to skip CCA for the indicated CoT once a wake up signal is detected and decoded, e.g., as shown, which may reduce the power consumption by the gNB.

Figure 10:
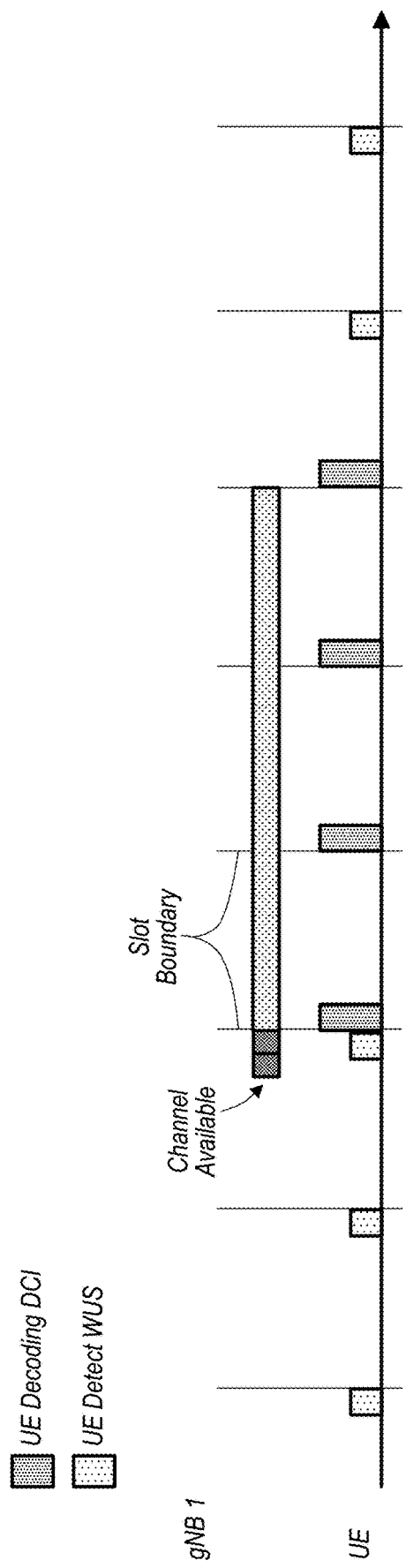

FIG. 10 illustrates a scenario in which a gNB and a UE served by the gNB (or by a different gNB that is synchronous to the gNB) are operating on an unlicensed frequency channel. In the illustrated scenario, the UE may perform wake up signal detection for a window of time prior to the control channel decoding window at the beginning of each slot boundary. The UE may proceed with control channel decoding during the indicated CoT in accordance with its search space configuration if a wake up signal is detected and the cell ID matches the target cell for the UE, as may be the case in the scenario illustrated in FIG. 10. If no wake up signal is detected, the UE may not attempt control channel decoding during the control channel decoding window. If a wake up signal is detected indicating a cell other than the serving cell, the UE may be able to skip monitoring the channel for wake up signals and also skip control channel decoding for the duration of the indicated CoT. At least according to some embodiments, monitoring the channel for wake up signals may have a lower power consumption cost than performing blind decoding. Thus, the UE may be able to obtain power savings by avoiding unnecessary control channel decoding.

Figure 11:
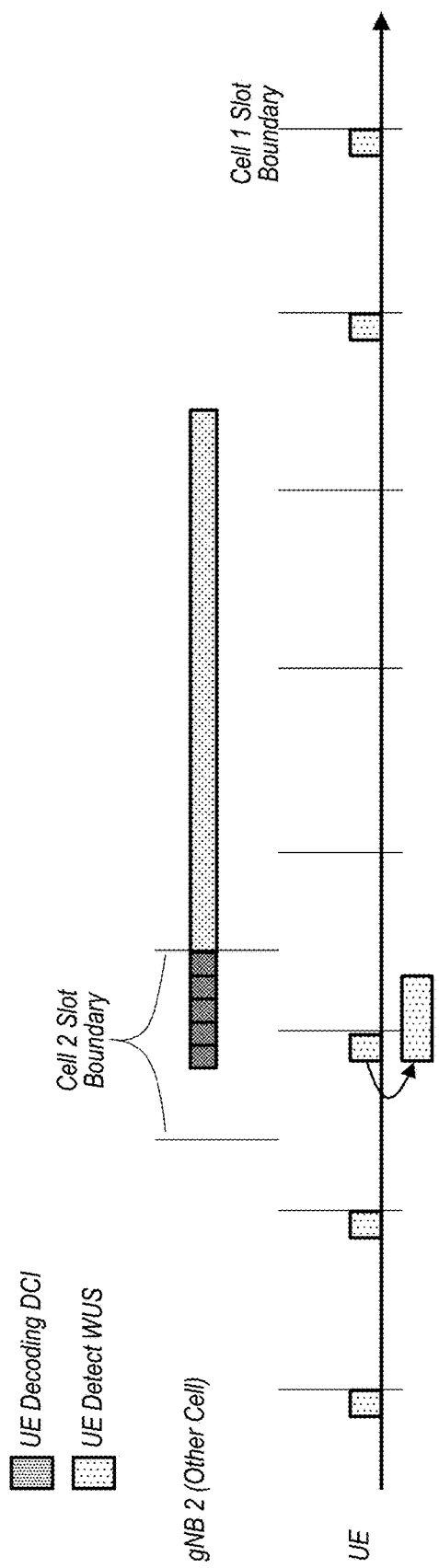

FIG. 11 illustrates a scenario in which a gNB and a UE that is served by a different asynchronous gNB are operating on an unlicensed frequency channel. As in the scenario of FIG. 10, in the illustrated scenario, the UE may perform wake up signal detection for a window of time prior to the control channel decoding window at the beginning of each slot boundary. Since the UE may perform such WUS (and downlink control information) detection for a limited window, e.g., at discrete locations after synchronizing to its serving cell, it may be the case that the UE may not be synchronous to (or detect) the wake up signal transmission from different asynchronous cells. However, it may still be possible for a UE to benefit from the WUS transmitted by other asynchronous cells, such as in the illustrated scenario. For example, the UE may perform energy detection prior to control channel decoding, e.g., in a similar or the same window as WUS detection is performed. If such energy detection exceeds a certain threshold (e.g., which may determined by the UE, signaled by the UE's serving cell, configured in cellular standard technical specification documents, or otherwise determined), the UE may expand the WUS search window to try to detect a WUS transmission from an asynchronous cell. The expanded window could include future samples and/or trace-back samples, e.g., assuming the sample buffer has not yet been flushed, according to various embodiments. If a WUS is detected and the CoT can be decoded, the UE may be able to skip energy and WUS detection (as well as control channel decoding) for the indicated CoT duration. Thus, the UE may also be able to obtain power savings by avoiding unnecessary control channel decoding in such a scenario. Note that such use of an expanded WUS detection window may be made more effective if the cell repeats the WUS transmission as a reservation signal one or more times leading up to its next slot boundary, e.g., as shown in FIG. 11, at least according to some embodiments.

Figure 12:
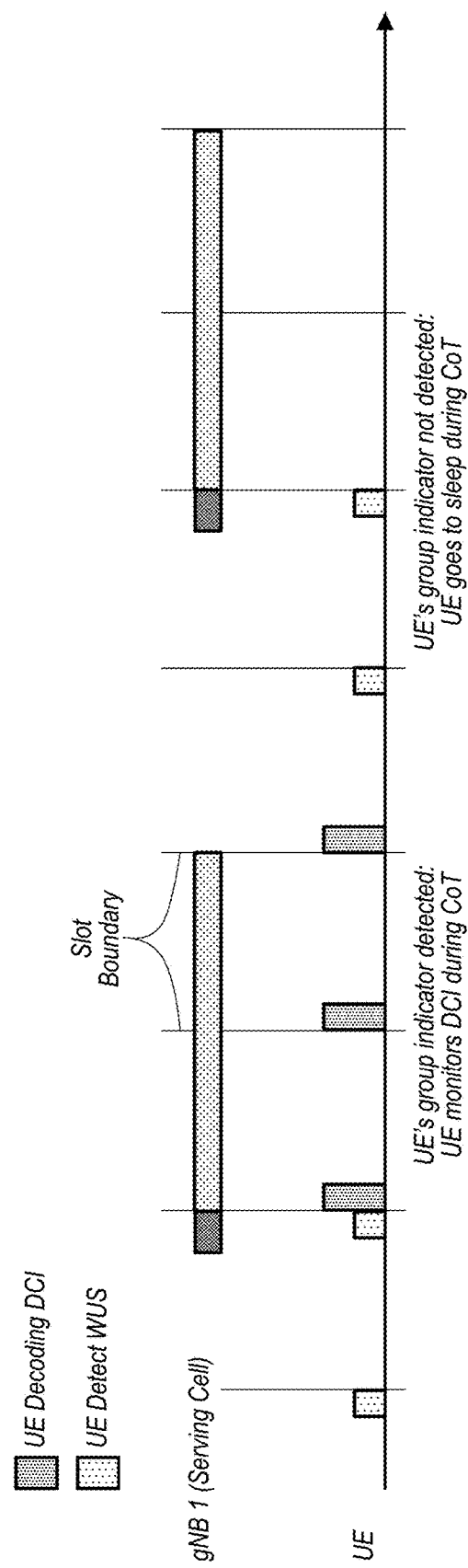

As previously noted, in some instances it may be possible to include UE group ID information as part of a WUS. FIG. 12 illustrates a scenario in which a gNB and a UE served by the gNB are operating on an unlicensed frequency channel, and further in which the gNB includes such UE group ID information as part of its WUS transmissions. The gNB may pre-assign UEs served by the gNB to one or more groups with each group being associated with a group ID or group specific bit field that can be indicated in the WUS signal, e.g., together with the cell ID indication.

Similar to the scenarios illustrated is FIGS. 10 and 11, the UE may perform wake up signal detection for a window of time prior to the control channel decoding window at the beginning of each slot boundary. In such a scenario, the UE may start blind decoding the control channel only if the corresponding cell ID and the UE group indicator are identified. Thus, as shown, when the UE detects the UE's group indicator, the UE may monitor the control channel for downlink control information during the indicated CoT. When the UE does not detect the UE's group indicator, the UE may be able to operate in a reduced power consumption mode (e.g., go to sleep) during the indicated CoT.

Figure 13:
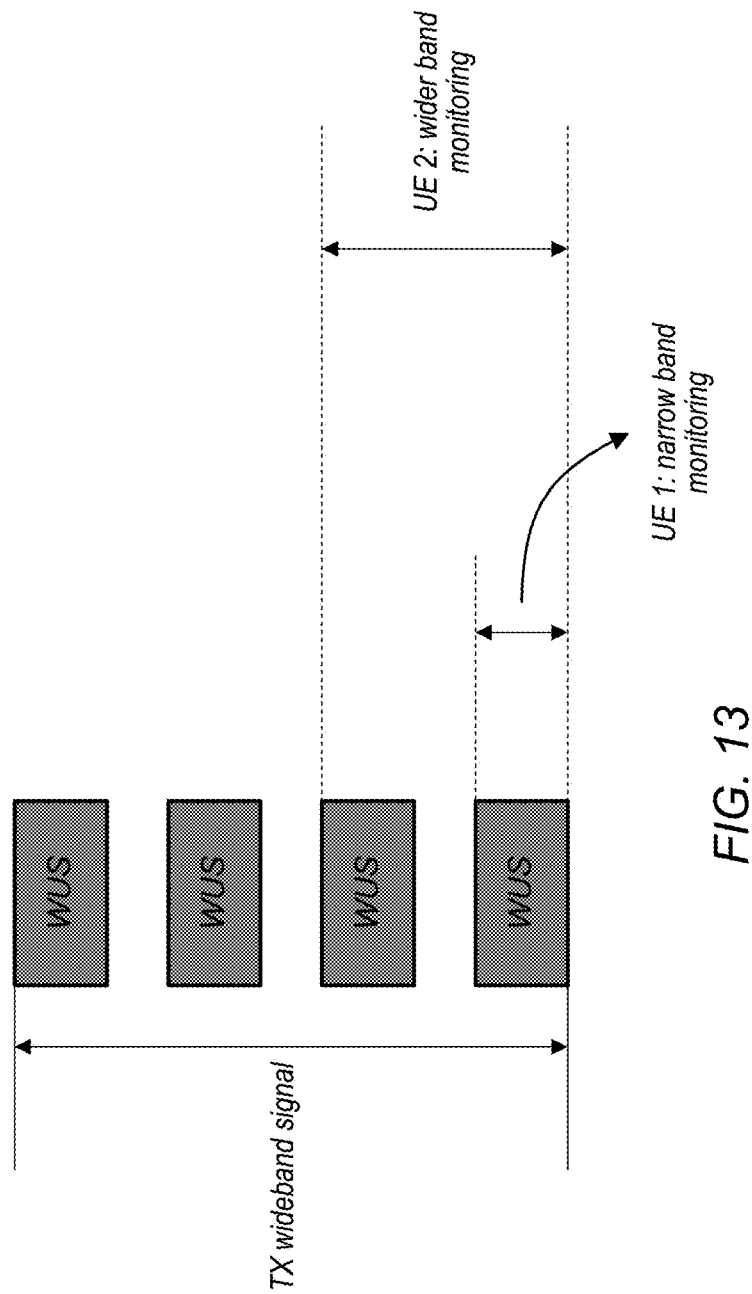
FIG. 13 illustrates an example scheme in which multiple narrowband repetitions of a wake up signal are transmitted within an unlicensed frequency channel, according to some embodiments.

Note that if desired, it may be possible for the wake up signal to be transmitted using a narrowed bandwidth than the full bandwidth of the unlicensed frequency channel, at least according to some embodiments. In such a scenario, the transmitter may repeat the signal in the frequency domain, such as illustrated in FIG. 13, e.g., to satisfy channel occupancy bandwidth (COB) requirements, and/or to provide flexibility to receivers to select whether to monitor fewer frequency repetitions (e.g., spanning a narrower bandwidth), or more frequency repetitions (e.g., spanning a wider bandwidth). In the illustrated scenario, a first UE ('UE 1') may perform narrow band WUS monitoring, e.g., to further reduce power consumption for wake up signal detection, while a second UE ('UE 2') may perform wider band WUS monitoring, e.g., for better detection performance. Note that the illustrated scenario is provided as an example only, and that numerous other configurations (e.g., including different numbers of frequency repetitions by the transmitter, different bandwidth monitoring by the receiver(s), etc.) are also possible.

In the following further exemplary embodiments are provided.

One set of embodiments may include an apparatus, comprising a processing element configured to cause a wireless device to: establish a cellular link with a cellular base station, wherein the cellular base station provides a cell that is deployed on an unlicensed frequency channel; monitor the unlicensed frequency channel for a wake up signal; and determine whether to monitor the unlicensed frequency channel for control channel signaling for at least a first slot of the cell that is deployed on the unlicensed frequency band based at least in part on whether a wake up signal is detected.

According to some embodiments, monitoring the unlicensed frequency channel for a wake up signal is performed during a wake up signal window immediately prior to a slot boundary of the first slot, wherein the wireless device does not monitor the unlicensed frequency channel for control channel signaling during the first slot when a wake up signal is not detected during the wake up signal window immediately prior to the slot boundary of the first slot.

According to some embodiments, the processing element is further configured to cause the wireless device to: detect a wake up signal during the wake up signal window immediately prior to the slot boundary of the first slot; determine a channel occupancy time and a cell identifier indicated by the wake up signal; and determine whether to monitor the unlicensed frequency channel for control channel signaling for at least the first slot further based at least in part on the channel occupancy time and the cell identifier.

According to some embodiments, the wireless device does not monitor the unlicensed frequency channel for control channel signaling during the first slot if the cell identifier indicated by the wake up signal is not associated with a serving cell of the wireless device, wherein the wireless device further does not monitor the unlicensed frequency channel during one or more additional slots up to the length of the channel occupancy time indicated by the wake up signal if the cell identifier indicated by the wake up signal is not associated with a serving cell of the wireless device.

According to some embodiments, the processing element is further configured to cause the wireless device to: determine a wireless device group indicated by the wake up signal; and determine whether to monitor the unlicensed frequency channel for control channel signaling for at least the first slot further based at least in part on the wireless device group; wherein the wireless device determines to monitor the unlicensed frequency channel for control channel signaling during the first slot and during one or more additional slots up to the length of the channel occupancy time indicated by the wake up signal if the cell identifier indicated by the wake up signal is associated with a serving cell of the wireless device and the wireless device is associated with the wireless device group indicated by the wake up signal, wherein the wireless device does not monitor the unlicensed frequency channel for control channel signaling during the first slot and during the one or more additional slots up to the length of the channel occupancy time indicated by the wake up signal if the wireless device is not associated with the wireless device group indicated by the wake up signal.

According to some embodiments, the processing element is further configured to cause the wireless device to: perform energy sensing on the unlicensed frequency channel; and determine whether to expand a wake up signal monitoring window based at least in part on performing the energy sensing on the unlicensed frequency channel, wherein the wake up signal monitoring window is expanded when energy levels above a configured threshold are detected.

Another set of embodiments may include a wireless device, comprising: an antenna; a radio operably coupled to the antenna; and a processing element operably coupled to the radio; wherein the wireless device is configured to: establish a cellular link with a cellular base station, wherein the cellular base station provides a serving cell that is deployed on an unlicensed frequency channel for the wireless device; monitor the unlicensed frequency channel for a wake up signal during a wake up signal window associated with a first slot of the serving cell; and determine whether to monitor the unlicensed frequency channel for control channel signaling for the first slot of the serving cell based at least in part on whether a wake up signal is detected.

According to some embodiments, the wireless device does not monitor the unlicensed frequency channel for control channel signaling for the first slot when a wake up signal is not detected during the wake up signal window associated with the first slot of the serving cell.

According to some embodiments, the wireless device is further configured to: detect a wake up signal during the wake up signal associated with the first slot of the serving cell; determine a channel occupancy time and a cell identifier indicated by the wake up signal; determine to monitor the unlicensed frequency channel for control channel signaling for at least the first slot if the cell identifier indicated by the wake up signal is associated with the serving cell of the wireless device; and determine to not monitor the unlicensed frequency channel for control channel signaling for at least the first slot if the cell identifier indicated by the wake up signal is not associated with the serving cell of the wireless device.

According to some embodiments, the wireless device is further configured to: determine to monitor the unlicensed frequency channel for control channel signaling for one or more additional slots through a duration of the channel occupancy time indicated by the wake up signal if the cell identifier indicated by the wake up signal is associated with the serving cell of the wireless device; and determine to not monitor the unlicensed frequency channel for control channel signaling for one or more additional slots through the duration of the channel occupancy time indicated by the wake up signal if the cell identifier indicated by the wake up signal is not associated with the serving cell of the wireless device.

According to some embodiments, the wireless device is further configured to: detect a wake up signal during the wake up signal associated with the first slot of the serving cell; determine a channel occupancy time, a cell identifier, and a wireless device group identifier indicated by the wake up signal; determine to monitor the unlicensed frequency channel for control channel signaling for at least the first slot if the cell identifier indicated by the wake up signal is associated with the serving cell of the wireless device and if the wireless device is associated with the wireless device group identifier indicated by the wake up signal; and determine to not monitor the unlicensed frequency channel for control channel signaling for at least the first slot if the cell identifier indicated by the wake up signal is not associated with the serving cell of the wireless device or if the wireless device is not associated with the wireless device group identifier indicated by the wake up signal.

According to some embodiments, the wireless device is further configured to: determine to monitor the unlicensed frequency channel for control channel signaling for one or more additional slots through a duration of the channel occupancy time indicated by the wake up signal if the cell identifier indicated by the wake up signal is associated with the serving cell of the wireless device and if the wireless device is associated with the wireless device group identifier indicated by the wake up signal; and determine to not monitor the unlicensed frequency channel for control channel signaling for one or more additional slots through the duration of the channel occupancy time indicated by the wake up signal if the cell identifier indicated by the wake up signal is not associated with the serving cell of the wireless device or if the wireless device is not associated with the wireless device group identifier indicated by the wake up signal.

According to some embodiments, the processing element is further configured to cause the wireless device to: perform energy sensing on the unlicensed frequency channel during an energy sensing window associated with the first slot of the serving cell; and determine a length of the wake up signal window associated with the first slot of the serving cell based at least in part on performing the energy sensing, wherein a longer wake up signal window is selected when energy levels above a configured threshold are detected than when energy levels above the configured threshold are not detected.

Yet another set of embodiments may include a cellular base station, comprising: an antenna; a radio operably coupled to the antenna; and a processing element operably coupled to the radio; wherein the cellular base station is configured to: perform a listen-before-talk procedure on an unlicensed frequency channel; provide a wake up signal on the unlicensed frequency channel when the listen-before-talk procedure is successful, wherein the wake up signal comprises a preamble configured for coherent detection, wherein the wake up signal further comprises information indicating channel occupancy time for a cellular communication by the cellular base station and a cell identifier for the cellular base station; and perform the cellular communication.

According to some embodiments, the cellular base station is further configured to: detect a wake up signal provided by a second cellular base station during the listen-before-talk procedure; and determine a channel occupancy time of the unlicensed frequency channel by the second cellular base station based at least in part on the wake up signal provided by the second cellular base station, wherein the cellular base station does not perform clear channel assessment for the unlicensed frequency channel for the channel occupancy time of the unlicensed frequency channel by the second cellular base station.

According to some embodiments, the cellular base station is further configured to: resume performing clear channel assessment after the channel occupancy time of the unlicensed frequency channel by the second cellular base station.

According to some embodiments, to provide the wake up signal on the unlicensed frequency channel, the cellular base station is further configured to: provide a plurality of narrowband transmissions of the wake up signal at different frequency locations within the unlicensed frequency channel.

According to some embodiments, the wake up signal further comprises information indicating a wireless device group identifier associated with the cellular communication by the cellular base station.

According to some embodiments, the wireless device group identifier indicates to wireless devices in a wireless device group associated with the wireless device group identifier to monitor the unlicensed frequency channel for control channel signaling during the indicated channel occupancy time.

According to some embodiments, the wireless device group identifier indicates to wireless devices that are not in a wireless device group associated with the wireless device group identifier to not monitor the unlicensed frequency channel for control channel signaling during the indicated channel occupancy time.

According to some embodiments, the cellular base station is further configured to: repeat the wake up signal a plurality of times between successful completion of the listen-before-talk procedure and a next scheduling opportunity according to a synchronization scheme used by the cellular base station.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
one or more processors configured to cause a wireless device to:
establish a cellular link with a cellular base station, wherein the cellular base station provides a cell that is deployed on an unlicensed frequency channel;
monitor the unlicensed frequency channel for a wake up signal, wherein the wake up signal is provided in a plurality of narrowband transmissions at different frequency locations within the unlicensed frequency channel; and
determine whether to monitor the unlicensed frequency channel for control channel signaling for at least a first slot or mini-slot of the cell that is deployed on the unlicensed frequency channel based at least in part on whether a wake up signal is detected.

2. The apparatus of claim 1,
wherein monitoring the unlicensed frequency channel for a wake up signal is performed during a wake up signal window immediately prior to a slot or mini-slot boundary of the first slot or mini-slot,
wherein the wireless device does not monitor the unlicensed frequency channel for control channel signaling during the first slot or mini-slot when a wake up signal is not detected during the wake up signal window immediately prior to the slot or mini-slot boundary of the first slot or mini-slot.

3. The apparatus of claim 2, wherein the one or more processors are further configured to cause the wireless device to:
detect a wake up signal during the wake up signal window immediately prior to the slot or mini-slot boundary of the first slot or mini-slot;
determine a channel occupancy time and a cell identifier indicated by the wake up signal; and
determine whether to monitor the unlicensed frequency channel for control channel signaling for at least the first slot or mini-slot further based at least in part on the channel occupancy time and the cell identifier.

4. The apparatus of claim 3,
wherein the wireless device does not monitor the unlicensed frequency channel for control channel signaling during the first slot or mini-slot if the cell identifier indicated by the wake up signal is not associated with a serving cell of the wireless device,
wherein the wireless device further does not monitor the unlicensed frequency channel during one or more additional slots and/or mini-slots up to the length of the channel occupancy time indicated by the wake up signal if the cell identifier indicated by the wake up signal is not associated with a serving cell of the wireless device.

5. The apparatus of claim 3, wherein the one or more processors are further configured to cause the wireless device to:
determine a wireless device group indicated by the wake up signal; and
determine whether to monitor the unlicensed frequency channel for control channel signaling for at least the first slot or mini-slot further based at least in part on the wireless device group;
wherein the wireless device determines to monitor the unlicensed frequency channel for control channel signaling during the first slot or mini-slot and during one or more additional slots and/or mini-slots up to the length of the channel occupancy time indicated by the wake up signal if the cell identifier indicated by the wake up signal is associated with a serving cell of the wireless device and the wireless device is associated with the wireless device group indicated by the wake up signal,
wherein the wireless device does not monitor the unlicensed frequency channel for control channel signaling during the first slot or mini-slot and during the one or more additional slots and/or mini-slots up to the length of the channel occupancy time indicated by the wake up signal if the wireless device is not associated with the wireless device group indicated by the wake up signal.

6. The apparatus of claim 1, wherein the one or more processors are further configured to cause the wireless device to:

perform energy sensing on the unlicensed frequency channel; and determine whether to expand a wake up signal monitoring window based at least in part on performing the energy sensing on the unlicensed frequency channel, wherein the wake up signal monitoring window is expanded when energy levels above a configured threshold are detected.

7. A wireless device, comprising:
an antenna;
a radio operably coupled to the antenna; and
a processor operably coupled to the radio;
wherein the wireless device is configured to:
   establish a cellular link with a cellular base station, wherein the cellular base station provides a serving cell that is deployed on an unlicensed frequency channel for the wireless device;
   monitor the unlicensed frequency channel for a wake up signal during a wake up signal window associated with a first slot or mini-slot of the serving cell, wherein the wake up signal is provided in a plurality of narrowband transmissions at different frequency locations within the unlicensed frequency channel; and
   determine whether to monitor the unlicensed frequency channel for control channel signaling for the first slot or mini-slot of the serving cell based at least in part on whether a wake up signal is detected.

8. The wireless device of claim 7, wherein the wireless device does not monitor the unlicensed frequency channel for control channel signaling for the first slot or mini-slot when a wake up signal is not detected during the wake up signal window associated with the first slot or mini-slot of the serving cell.

9. The wireless device of claim 7, wherein the wireless device is further configured to:
   detect a wake up signal during the wake up signal associated with the first slot or mini-slot of the serving cell;
   determine a channel occupancy time and a cell identifier indicated by the wake up signal;
   determine to monitor the unlicensed frequency channel for control channel signaling for at least the first slot or mini-slot if the cell identifier indicated by the wake up signal is associated with the serving cell of the wireless device; and
   determine to not monitor the unlicensed frequency channel for control channel signaling for at least the first slot or mini-slot if the cell identifier indicated by the wake up signal is not associated with the serving cell of the wireless device.

10. The wireless device of claim 9, wherein the wireless device is further configured to:
   determine to monitor the unlicensed frequency channel for control channel signaling for one or more additional slots and/or mini-slots through a duration of the channel occupancy time indicated by the wake up signal if the cell identifier indicated by the wake up signal is associated with the serving cell of the wireless device; and
   determine to not monitor the unlicensed frequency channel for control channel signaling for one or more additional slots and/or mini-slots through the duration of the channel occupancy time indicated by the wake up signal if the cell identifier indicated by the wake up signal is not associated with the serving cell of the wireless device.

11. The wireless device of claim 7, wherein the wireless device is further configured to:
   detect a wake up signal during the wake up signal associated with the first slot or mini-slot of the serving cell;
   determine a channel occupancy time, a cell identifier, and a wireless device group identifier indicated by the wake up signal;
   determine to monitor the unlicensed frequency channel for control channel signaling for at least the first slot or mini-slot if the cell identifier indicated by the wake up signal is associated with the serving cell of the wireless device and if the wireless device is associated with the wireless device group identifier indicated by the wake up signal; and
   determine to not monitor the unlicensed frequency channel for control channel signaling for at least the first slot or mini-slot if the cell identifier indicated by the wake up signal is not associated with the serving cell of the wireless device or if the wireless device is not associated with the wireless device group identifier indicated by the wake up signal.

12. The wireless device of claim 11, wherein the wireless device is further configured to:
   determine to monitor the unlicensed frequency channel for control channel signaling for one or more additional slots and/or mini-slots through a duration of the channel occupancy time indicated by the wake up signal if the cell identifier indicated by the wake up signal is associated with the serving cell of the wireless device and if the wireless device is associated with the wireless device group identifier indicated by the wake up signal; and
   determine to not monitor the unlicensed frequency channel for control channel signaling for one or more additional slots and/or mini-slots through the duration of the channel occupancy time indicated by the wake up signal if the cell identifier indicated by the wake up signal is not associated with the serving cell of the wireless device or if the wireless device is not associated with the wireless device group identifier indicated by the wake up signal.

13. The wireless device of claim 7, wherein the wireless device is further configured to:
   perform energy sensing on the unlicensed frequency channel during an energy sensing window associated with the first slot or mini-slot of the serving cell; and
   determine a length of the wake up signal window associated with the first slot or mini-slot of the serving cell based at least in part on performing the energy sensing, wherein a longer wake up signal window is selected when energy levels above a configured threshold are detected than when energy levels above the configured threshold are not detected.

14. A cellular base station, comprising:
an antenna;
a radio operably coupled to the antenna; and
a processor operably coupled to the radio;
wherein the cellular base station is configured to:
   perform a listen-before-talk procedure on an unlicensed frequency channel;
   provide a wake up signal on the unlicensed frequency channel when the listen-before-talk procedure is successful, wherein the wake up signal comprises a preamble configured for coherent detection, wherein the wake up signal further comprises information indicating channel occupancy time for a cellular communication by the cellular base station and a cell identifier for the cellular base station; and perform the cellular communication.

15. The cellular base station of claim 14, wherein the cellular base station is further configured to:

detect a wake up signal provided by a second cellular base station during the listen-before-talk procedure;

determine a channel occupancy time of the unlicensed frequency channel by the second cellular base station based at least in part on the wake up signal provided by the second cellular base station, wherein the cellular base station does not perform clear channel assessment for the unlicensed frequency channel for the channel occupancy time of the unlicensed frequency channel by the second cellular base station; and resume performing clear channel assessment after the channel occupancy time of the unlicensed frequency channel by the second cellular base station.

16. The cellular base station of claim 14, wherein to provide the wake up signal on the unlicensed frequency channel, the cellular base station is further configured to:

provide a plurality of narrowband transmissions of the wake up signal at different frequency locations within the unlicensed frequency channel.

17. The cellular base station of claim 14, wherein the wake up signal further comprises information indicating a wireless device group identifier associated with the cellular communication by the cellular base station.

18. The cellular base station of claim 17, wherein the wireless device group identifier indicates to wireless devices in a wireless device group associated with the wireless device group identifier to monitor the unlicensed frequency channel for control channel signaling during the indicated channel occupancy time.

19. The cellular base station of claim 17, wherein the wireless device group identifier indicates to wireless devices that are not in a wireless device group associated with the wireless device group identifier to not monitor the unlicensed frequency channel for control channel signaling during the indicated channel occupancy time.

20. The cellular base station of claim 14, wherein the cellular base station is further configured to:

repeat the wake up signal a plurality of times between successful completion of the listen-before-talk procedure and a next scheduling opportunity according to a synchronization scheme used by the cellular base station.

* * * * *